(12) United States Patent
Takeuchi et al.

(10) Patent No.: US 11,772,605 B2
(45) Date of Patent: Oct. 3, 2023

(54) SECURITY DEVICE FOR VEHICLE, SECURITY SYSTEM FOR VEHICLE, SECURITY METHOD FOR VEHICLE, AND NON-TRANSITORY COMPUTER-READABLE STORAGE MEDIUM FOR VEHICLE

(71) Applicant: DENSO CORPORATION, Kariya (JP)

(72) Inventors: Koichiro Takeuchi, Kariya (JP); Masaya Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/874,340

(22) Filed: Jul. 27, 2022

(65) Prior Publication Data
US 2023/0054160 A1 Feb. 23, 2023

(30) Foreign Application Priority Data
Aug. 20, 2021 (JP) .................. 2021-134938

(51) Int. Cl.
*B60R 25/31* (2013.01)
*B60R 25/01* (2013.01)
*B60R 25/30* (2013.01)
*B60R 25/102* (2013.01)

(52) U.S. Cl.
CPC .............. *B60R 25/31* (2013.01); *B60R 25/01* (2013.01); *B60R 25/102* (2013.01); *B60R 25/305* (2013.01)

(58) Field of Classification Search
CPC ......... B60R 25/00; B60R 25/01; B60R 25/10; B60R 25/102; B60R 25/30; B60R 256/31; B60R 1/12; G01S 7/00; G01S 7/02; G01S 13/04; G01S 13/46; G01S 13/56; G01S 15/00; G06F 7/00
See application file for complete search history.

(56) References Cited

U.S. PATENT DOCUMENTS

| | | | |
|---|---|---|---|
| 2018/0081048 A1* | 3/2018 | Saitou | G01S 13/46 |
| 2018/0292521 A1* | 10/2018 | Saitou | G01V 3/12 |
| 2021/0031656 A1* | 2/2021 | Kaiser | B60N 2/062 |
| 2022/0341962 A1* | 10/2022 | Lenke | G08B 25/016 |

FOREIGN PATENT DOCUMENTS

JP  2011-090645 A  5/2011

OTHER PUBLICATIONS

NPL Search (May 22, 2023).*

* cited by examiner

*Primary Examiner* — Van T Trieu
(74) *Attorney, Agent, or Firm* — Harness, Dickey & Pierce, P.L.C.

(57) ABSTRACT

A sensor detects a target by transmitting and receiving an electromagnetic wave, and is arranged in a vehicle compartment. A user's mobile terminal is notified via a cloud system when a vehicle is parked, and a suspicious object around the vehicle is detected by monitoring a periphery of the vehicle using the sensor. An obstacle interfering with a periphery monitoring and disposed in the vehicle compartment is detected using the sensor prior to the periphery monitoring. A detected obstacle is moved so as not to interfere with the periphery monitoring.

16 Claims, 4 Drawing Sheets

SECURITY DEVICE FOR VEHICLE, SECURITY SYSTEM FOR VEHICLE, SECURITY METHOD FOR VEHICLE, AND NON-TRANSITORY COMPUTER-READABLE STORAGE MEDIUM FOR VEHICLE

CROSS REFERENCE TO RELATED APPLICATION

The present application claims the benefit of priority from Japanese Patent Application No. 2021-134938 filed on Aug. 20, 2021. The entire disclosure of the above application is incorporated herein by reference.

TECHNICAL FIELD

The present disclosure relates to a security device for a vehicle, a security system for a vehicle, a security method for a vehicle, and a non-transitory computer-readable storage medium for a vehicle.

BACKGROUND

A conceivable technique teaches a vehicle recording device including a radio wave sensor that detects an object moving around the vehicle. This device is configured to control the camera in a recording standby state when an object is detected by the radio wave sensor, and then, when an anomaly state is detected, the device controls the camera to shoot an image of the object and record the captured image. Therefore, according to this device, when a suspicious person approaches and illegally operates the vehicle while the vehicle is parked, the image pickup and recording by the camera can be started.

SUMMARY

According to an example, a sensor detects a target by transmitting and receiving an electromagnetic wave, and is arranged in a vehicle compartment. A user's mobile terminal is notified via a cloud system when a vehicle is parked, and a suspicious object around the vehicle is detected by monitoring a periphery of the vehicle using the sensor. An obstacle interfering with a periphery monitoring and disposed in the vehicle compartment is detected using the sensor prior to the periphery monitoring. A detected obstacle is moved so as not to interfere with the periphery monitoring.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
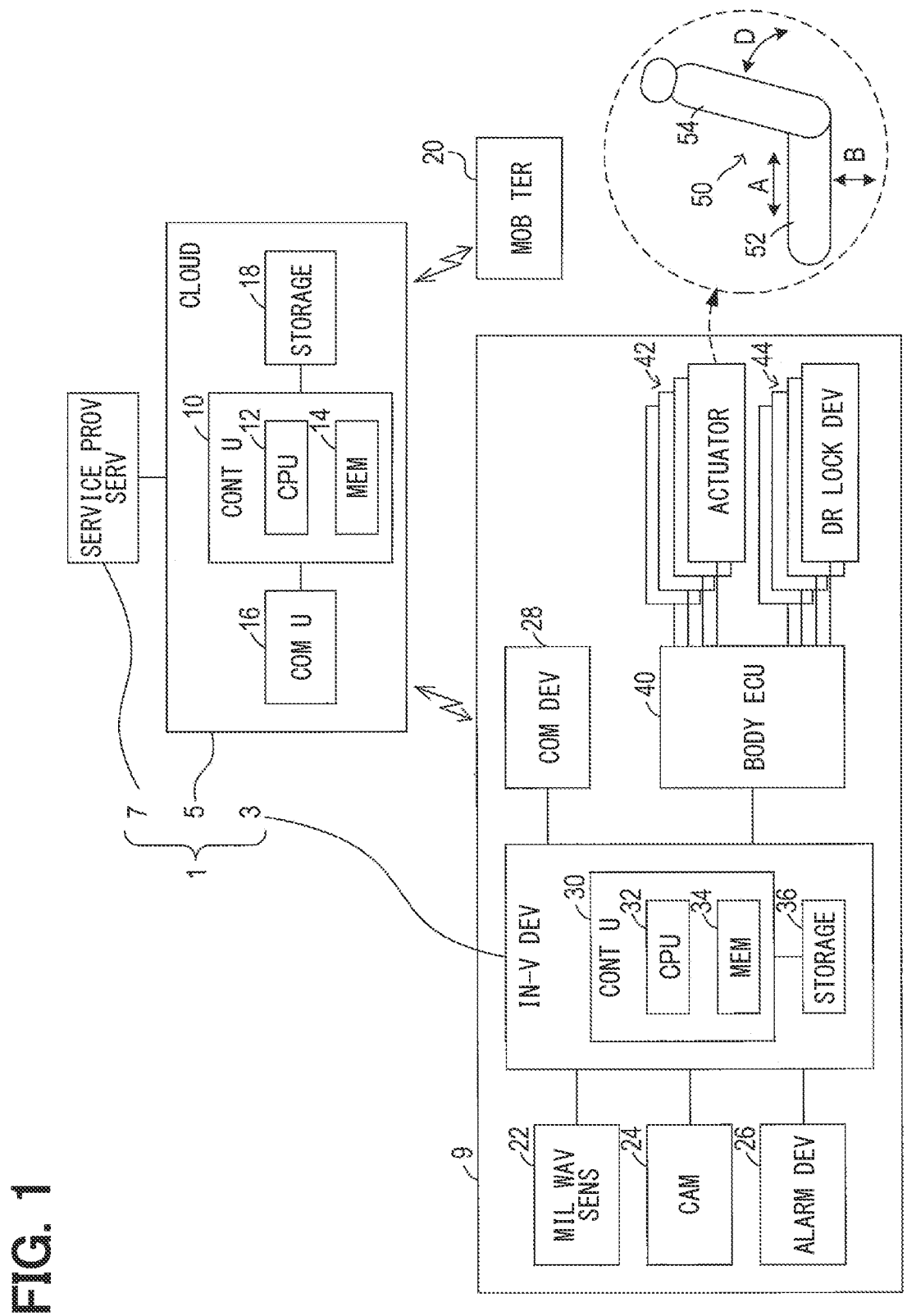
FIG. 1 is a block diagram showing a configuration of a mobility IoT system according to an embodiment.

According to a conceivable technique, when an object moving around a vehicle is detected by using a radio wave sensor, if the radio wave sensor is arranged in a position of a vehicle compartment where the vehicle surroundings can be seen in the vehicle compartment, an object such as a suspicious person or the like can be detected efficiently using a single sensor.

Here, the occupants can arbitrarily adjust the positions of equipment such as seats, mirrors, and monitors provided in the passenger compartment. For this reason, when the radio wave sensor disposed in the vehicle compartment is used to monitor the surroundings of the vehicle, these equipment may become obstacles to create blind spots and reduce the accuracy of object detection by peripheral monitoring.

One aspect of the present embodiments is to prevent equipment in the vehicle compartment from becoming an obstacle and reducing the accuracy of object detection by peripheral monitoring when monitoring the surroundings of the vehicle using a sensor provided in the vehicle compartment.

One aspect of the present embodiments provides a security device of a vehicle in which a sensor that radiates an electromagnetic wave and detects a target by receiving the reflected wave of the electromagnetic wave is arranged in the vehicle compartment. This security device includes a notification unit, an obstacle detection unit, and an obstacle movement unit.

The notification unit is configured to notify the user's mobile terminal via the cloud when a suspicious object around the vehicle is detected by monitoring the surroundings of the vehicle using a sensor when the vehicle is parked.

Further, when the vehicle is parked, the obstacle detection unit is configured to detect an obstacle that hinders peripheral monitoring in the vehicle compartment via a sensor prior to peripheral monitoring. Then, when an obstacle is detected by the obstacle detection unit, the obstacle movement unit is configured to move the obstacle so that the detected obstacle does not interfere with peripheral monitoring.

Therefore, in the vehicle security device of the present embodiments, when an obstacle in the vehicle compartment is detected by the obstacle detection unit under a condition that the vehicle is parked, an obstacle movement unit moves the obstacle so as not to interfere with peripheral monitoring.

Therefore, when the vehicle is parked, it becomes possible to accurately detect suspicious objects around the vehicle by monitoring the surroundings of the vehicle using the sensor, and the presence of suspicious objects is more noticeable to the user's mobile terminal.

Next, another aspect of the present embodiments provides the vehicle security system. This security system includes a communication device, a sensor arranged in the vehicle compartment of the vehicle, and a security device. The communication device is configured to be communicable between the user's mobile terminal and a communicable cloud. Further, the sensor is configured to radiate an electromagnetic wave and detect a target by receiving the reflected wave of the electromagnetic wave.

The security device includes a notification unit, an obstacle detection unit, and an obstacle movement unit, similar to the vehicle security device described above.

Therefore, even in the vehicle security system of the present embodiments, it is possible to move an obstacle that interferes with the peripheral monitoring in the vehicle compartment before starting the peripheral monitoring of the vehicle using the sensor, and suspicious objects around the vehicle can be detected with high accuracy.

Next, another aspect of the present embodiments provides a security method for a vehicle in which a sensor that radiates an electromagnetic wave and detects a target by receiving the reflected wave of the electromagnetic wave is provided in the vehicle compartment.

In this security method, when a suspicious object around the vehicle is detected by monitoring the surroundings of the vehicle using a sensor under a condition that the vehicle is parked, the user's mobile terminal is notified via the cloud, i.e., a cloud system.

In addition, when the vehicle is parked, obstacles that interfere with peripheral monitoring are detected in the vehicle compartment via the sensor, and when the obstacles are detected, the detected obstacles are moved so as not to interfere with peripheral monitoring.

Therefore, according to the vehicle security method of the present embodiments, an obstacle that hinders the peripheral monitoring is moved in the vehicle compartment by the same procedure as the vehicle security device described above before starting the peripheral monitoring of the vehicle. And the same effect as above can be obtained.

Next, another aspect of the present embodiments provides a program that causes the computer to function as the above-mentioned notification unit, obstacle detection unit, and obstacle movement unit. Therefore, according to this program, the above-mentioned security method can be realized by the computer, and the same effects as the above-mentioned vehicle security device, security system, and security method can be obtained.

Hereinafter, embodiments of the present disclosure will be described with reference to the drawings.

Embodiment

In the present embodiment, the vehicle security device of the present disclosure is realized as one function of the in-vehicle device 3 constituting the mobility IoT system 1 shown in FIG. 1. IoT is an abbreviation for Internet of Things.

1. Configuration of Mobility IoT System 1

As shown in FIG. 1, the mobility IoT system 1 includes an in-vehicle device 3, a cloud 5, and a service providing server 7. Although FIG. 1 describes one in-vehicle device 3 having a function as a security device for convenience, the mobility IoT system 1 includes a plurality of in-vehicle devices 3 mounted on different vehicles 9.

The in-vehicle device 3 can communicate with the cloud 5 via the communication device 28 mounted on the vehicle 9. The cloud 5 can communicate with the in-vehicle device 3, the service providing server 7, and the mobile terminal 20. The mobile terminal 20 is, for example, a mobile terminal owned by a user such as the owner of the vehicle 9. Examples of the mobile terminal 20 include smartphones, tablet terminals, notebook PCs, and the like.

The cloud 5 includes a control unit 10, a communication unit 16, and a storage unit 18. The control unit 10 includes a CPU 12 and a semiconductor memory such as RAM or ROM (hereinafter referred to as memory 14).

The function of the control unit 10 is realized by the CPU 12 executing the program stored in the memory 14. By executing this program, a method corresponding to the program is executed. The communication unit 16 can perform wireless communication with the communication device 28 and the mobile terminal 20. The storage unit 18 can record information.

The service providing server 7 can communicate with the cloud 5. The service providing server 7 is, for example, a server installed to provide a service for managing the operation of the vehicle 9. The mobility IoT system 1 may include a plurality of service providing servers 7 having different service contents.

The cloud 5 collects data of the vehicle 9 transmitted from each of the plurality of in-vehicle devices 3 via the communication device 28. The cloud 5 stores the collected data in the storage unit 18 for each vehicle 9, Further, the cloud 5 creates a digital twin based on the data of the vehicle 9 stored in the storage unit 18. Digital twins have normalized index data.

The service providing server 7 can acquire the data of the predetermined vehicle stored in the storage unit 18 by using the index data acquired from the digital twin. The service providing server 7 determines the control content to be instructed to the vehicle 9, and transmits the instruction corresponding to the control content to the cloud 5. The cloud 5 transmits the control content to the vehicle 9 based on the instruction.

2. Configuration of In-Vehicle Device 3 and Vehicle 9

As shown in FIG. 1, the in-vehicle device 3 includes a control unit 30 and a storage unit 36. The control unit 30 includes a CPU 32 and a semiconductor memory such as RAM or ROM (hereinafter referred to as memory 34). The function of the control unit 30 is realized by the CPU 32 executing the program stored in the memory 34. By executing this program, a method corresponding to the program is executed.

The storage unit 36 can record information. The storage unit 36 stores, for example, the monitoring result of monitoring the periphery of the vehicle 9 while the vehicle 9 is parked by the function of the in-vehicle device 3 as a security device.

A millimeter wave sensor 22 provided in the vehicle compartment is used for monitoring the surroundings of the vehicle 9 while the vehicle is parked. The millimeter wave sensor 22 is an omnidirectional radar device configured to detect a target by radiating a millimeter radio wave in all directions over 360 degrees around the vehicle 9 and receiving the reflected wave.

Figure 2:
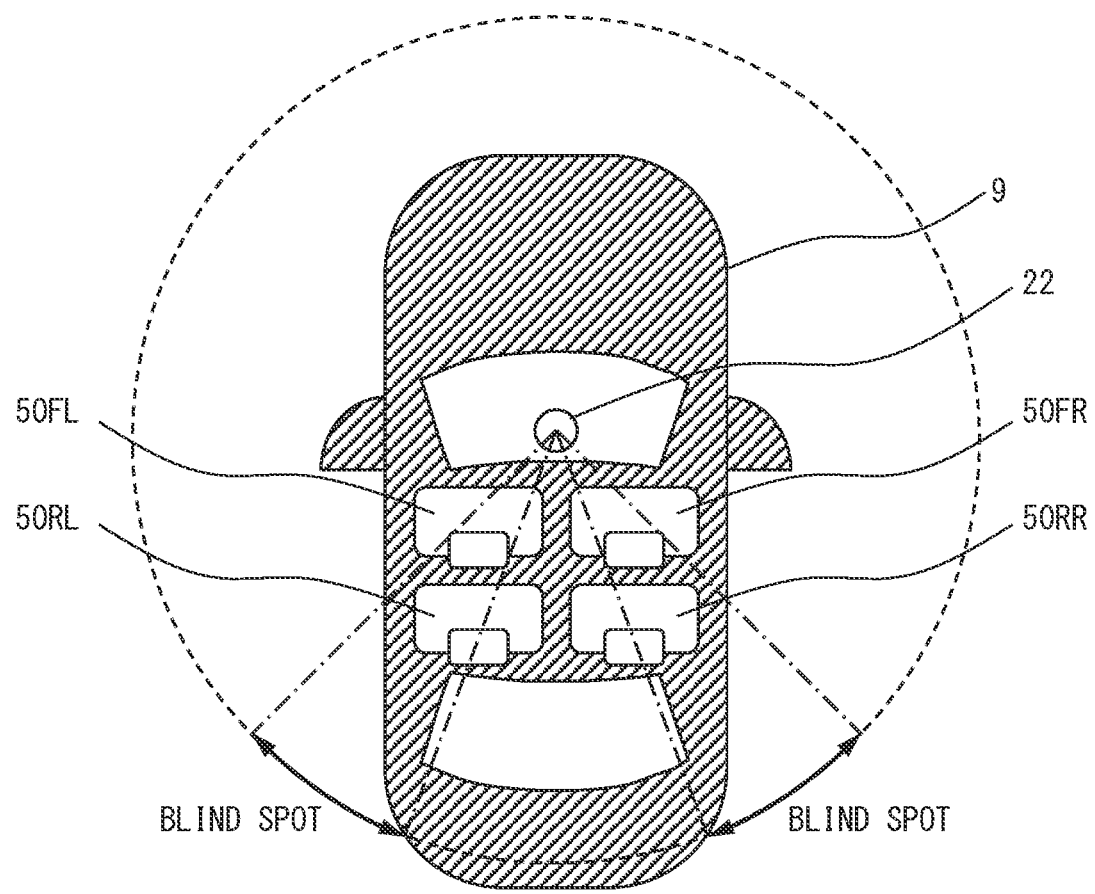
FIG. 2 is an explanatory diagram showing a monitoring area by a sensor installed in a vehicle compartment.

Therefore, as shown in FIG. 2, the millimeter wave sensor 22 is Installed in the central portion above the windshield overlooking the periphery of the vehicle 9. The millimeter wave emitted from the millimeter wave sensor 22 passes through the windshield, the rear glass, and the left and right door glasses, and is radiated to the entire area around the vehicle shown by the dotted line in FIG. 2. A plurality of millimeter wave sensors 22 may be provided corresponding to each of the front, rear, right side, and left sides.

By the way, if there is an obstacle in the vehicle compartment that blocks the millimeter wave emitted from the millimeter wave sensor 22, a blind spot is created in which a target around the vehicle cannot be detected. Examples of obstacles include the backrests and headrests of the seats 50 installed at four locations in the front, rear, left and right sides of the vehicle compartment.

In FIG. 2, the subscripts FL, FR, RL, and RR assigned to the seat symbol "50" represent the front left side, the front right side, the rear left side, and the rear right side, respectively. FIG. 2 shows a state in which a blind spot is generated by blocking the millimeter wave emitted from the millimeter wave sensor 22 with the headrests of the seats 50FL and 50RL arranged on the left and right side in front of the vehicle compartment.

As described above, when a blind spot occurs, it is not possible to normally perform peripheral monitoring using the millimeter wave sensor 22 while the vehicle 9 is parked, Therefore, when the vehicle 9 is parked and the peripheral monitoring using the millimeter wave sensor 22 is started, the in-vehicle device 3 detects the presence or absence of an obstacle blocking the millimeter wave from the millimeter wave sensor 22 in the vehicle compartment. Then, when an obstacle exists, the obstacle is moved so that the obstacle does not interfere with the peripheral monitoring.

In the present embodiment, it is assumed that the seats 50FL, 50FR, 50RL, 50RR in the vehicle compartment may be obstacles. Therefore, as shown in FIG. 1, the four seats 50 in the vehicle compartment are provided by an electric power seat with an actuator 42 that moves the seat surface 52 in the front-rear direction A and the height direction B and changes the inclination D of the backrest 54.

The actuator 42 provided in each seat 50 can be driven and controlled by the body ECU 40 mounted on the vehicle. The body ECU 40 is an electronic control device for controlling the vehicle body.

Therefore, the body ECU 40 is connected to the in-vehicle device 3. The in-vehicle device 3 drives each seat 50 as a movable equipment by driving the actuator 42 of each seat 50 via the body ECU 40.

It should be noted that not only the seat 50 but also equipment installed on the ceiling such as a rear view mirror and a monitor may be obstacles in the vehicle compartment. Therefore, in this case, these equipments that may be obstacles are made movable, and each movable equipment is provided with an actuator for moving the equipment so as not to interfere with the peripheral monitoring.

Then, by connecting the actuator to the body ECU 40, the in-vehicle device 3 can drive the actuator of each equipment via the body ECU 40. In this way, the in-vehicle device 3 can move each equipment so as not to interfere with peripheral monitoring.

Further, a door lock device 44 for locking and unlocking the left and right doors of the vehicle 9 is also connected to the body ECU 40. Therefore, the in-vehicle device 3 can detect the locked and unlocked state of the door of the vehicle 9 via the body ECU 40.

Next, the vehicle-mounted device 3 is also connected to the peripheral monitoring camera 24 and the alarm device 26 provided in the vehicle 9.

The camera 24 captures the surroundings of the vehicle 9 and is used to record an image of the surroundings while the vehicle 9 is traveling. Further, while the vehicle 9 is parked, the camera 24 takes an image of the periphery of the vehicle 9 in accordance with a command from the in-vehicle device 3.

Then, when a suspicious object is detected by peripheral monitoring by the millimeter wave sensor 22 while the vehicle 9 is parked, the in-vehicle device 3 activates the camera 24 to image the suspicious object. Further, the in-vehicle device 3 determines whether or not the captured suspicious object is a suspicious person who causes harm to the vehicle 4 by performing image processing on the captured image, and if it is a suspicious person, the in-vehicle device 3 notifies to the user's mobile terminal 20 via the cloud 5, and stores the captured image in the storage unit 36.

The alarm device 26 includes, for example, a speaker for voice output, a horn for alarm sound output, a lamp for alarm, and the like. The alarm device 26 is used to issue an alarm by sound or light when the in-vehicle device 3 detects a suspicious object or when an anomaly occurs in the vehicle 9 after the detection of the suspicious object, 3. Operation of Millimeter Wave Sensor 22

The millimeter wave sensor 22 is a radar device that detects a target existing around the millimeter wave sensor 22, specifically, the distance to the target and the direction of the target by transmitting and receiving millimeter radio waves. Then, when the operation mode is switched from the normal mode for target detection to the monitoring mode by the in-vehicle device 3, it is determined whether the detected target is a suspicious object approaching the vehicle 9 by the procedure shown in FIG. 3.

That is, when the millimeter wave sensor 22 is in the monitoring mode, the peripheral monitoring process for detecting a target existing in the vicinity of the vehicle 9 is performed in S110. Then, in the following S120, it is determined whether a suspicious object approaching the vehicle exists by determining whether or not the target is approaching the vehicle based on the position of the target detected by the peripheral monitoring process and the past detected position.

When it is determined in S120 that there is a suspicious object approaching the vehicle 9, the detection signal of the suspicious object is output to the in-vehicle device 3 in S130, and the process shifts to S140. Further, even when it is determined in S120 that there is no suspicious object, the process shifts to S140.

In S140, it is determined whether or not a mode change command for returning the operation mode to the normal mode has been input from the in-vehicle device 3, and when the mode change command has not been input, the process proceeds to S110. When the mode change command is input, the operation mode of the millimeter wave sensor 22 is returned to the normal mode in S150, and the peripheral monitoring process shown in FIG. 3 is terminated.

Figure 3:
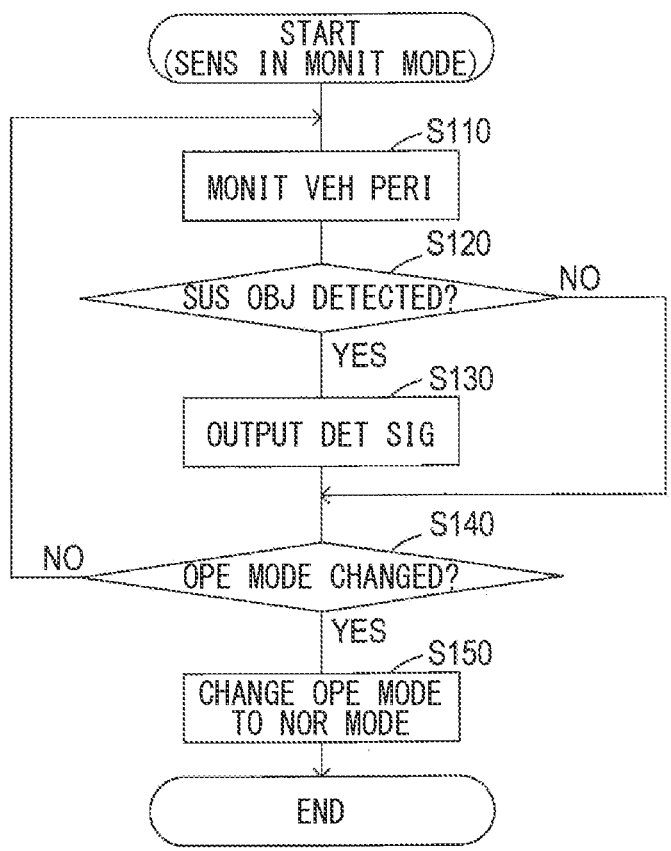
FIG. 3 is a flowchart showing a peripheral monitoring operation when the sensor is in the monitoring mode.

The peripheral monitoring process shown in FIG. 3 may be realized by a program executed by a microcomputer provided in the millimeter wave sensor 22, or may be realized by an operation of a logic circuit provided in the millimeter wave sensor 22.

4. Operation of the In-Vehicle Device 3 as a Security Device

Figure 4:
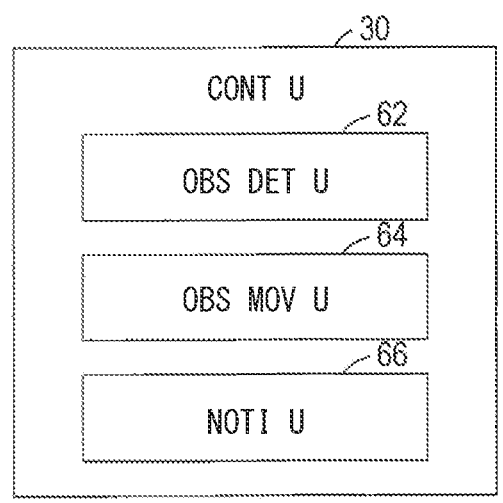
FIG. 4 is a functional block diagram showing a functional configuration of a control unit of an in-vehicle device.

In the in-vehicle device 3, the control unit 30 includes an obstacle detection unit 62, an obstacle movement unit 64, and a notification unit 66 as a configuration for functioning the in-vehicle device 3 as a security device, as shown in FIG. 4.

Here, when the vehicle 9 is parked, the millimeter-wave sensor 22 is operated in the normal mode to control the obstacle detection unit 62 providing a function so that the millimeter-wave sensor 22 detects an obstacle that hinders peripheral monitoring in the vehicle compartment.

Further, the obstacle movement unit 64 is a function of moving an obstacle when the obstacle is detected by the obstacle detection unit 62, so that the obstacle does not interfere with peripheral monitoring. The obstacle movement unit 64 acquires the positions of the seats 50 that can be moved by the actuator 42 in the vehicle compartment from the body ECU 40 and stores them in the storage unit 36.

When the obstacle detection unit 62 detects an obstacle, the obstacle movement unit 64 identifies the seat 50 corresponding to the position of the detected obstacle as a moving target. Then, by driving the actuator 42 provided in the specified seat 50 via the body ECU 40, the moving target detected as an obstacle is moved so as not to interfere with the peripheral monitoring.

In this movement, the procedure is executed such that, for example, the height of the seat 50, which is the moving target, is set to the lowest height to determine whether or not the obstacle is no longer detected. When the obstacle is still detected, the seat 50 is moved forward, and the backrest 54 is tilted backward.

Here, this movement order may be appropriately set, and may be appropriately changed, for example, the seat 50 may be moved backward and the backrest 54 may be tilted forward. Further, when the seat 50 can be rotated by the actuator 42, the seat 50 may be rotated.

Next, when the vehicle 9 is parked, the notification unit 66 provides the function such that the operation mode of the millimeter wave sensor 22 is set to the monitoring mode, and the millimeter wave sensor 22 detects a suspicious object approaching the vehicle 9.

When the suspicious object is detected by the millimeter wave sensor 22, the notification unit 66 uses the camera 24 to determine whether or not the suspicious object is a suspicious person who attempts to illegally operate the vehicle 9. Then, when the suspicious object detected by the millimeter wave sensor 22 is a suspicious person, the information of the suspicious person such as an image captured by the camera 24 is transmitted from the communication device 28 to the cloud 5. As a result, the cloud 5 informs the user's mobile terminal 20 that a suspicious person is approaching the vehicle 9.

Next, the control process executed by the CPU 32 in order to make the control unit 30 function as the obstacle detection unit 62, the obstacle movement unit 64, and the notification unit 66 will be described with reference to the flowchart shown in FIG. 5. It should be noted that this flowchart corresponds to the program stored in the memory 34.

Figure 5:
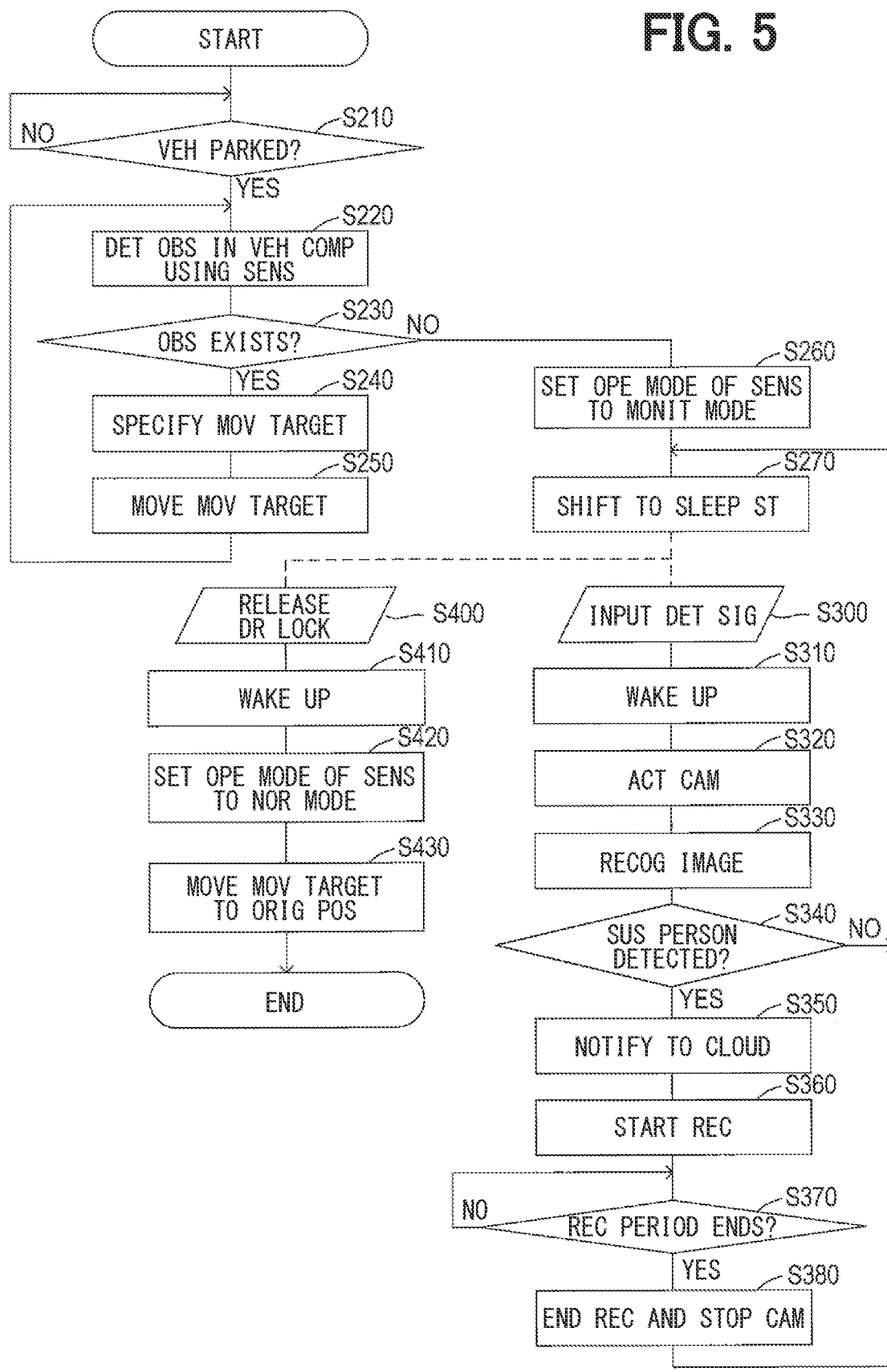
FIG. 5 is a flowchart showing a control process executed by a control unit of an in-vehicle device.

As shown in FIG. 5, in this control process, first, in S210 it is determined whether or not the vehicle 9 is parked, thereby waiting for the vehicle 9 to be parked.

In S210, for example, when the drive of the engine or the drive of the motor that is the power source of the vehicle 9 is stopped while the vehicle 9 is stopped, and all the door lock devices 44 connected to the body ECU 40 are switched to the locked state, it is determined that the vehicle 9 is parked.

The engine stop can be detected, for example, when the ignition switch is turned off, and the motor stop can be detected, for example, when the power switch provided in the power supply path to the motor is turned off.

When it is determined in S210 that the vehicle 9 is parked, the process proceeds to S220, the millimeter wave sensor 22 is operated to detect an obstacle that hinders peripheral monitoring in the vehicle compartment. Specifically, among the objects detected by the millimeter wave sensor 22, the object existing in the vehicle compartment at a position that blocks the millimeter wave for peripheral monitoring is detected as an obstacle.

Next, in S230, it is determined whether or not an obstacle is detected in S220, and when an obstacle is detected, the process proceeds to S240, and the moving target to be moved from the position of the obstacle in the vehicle compartment not to interfere with peripheral monitoring is specified.

In the present embodiment, four seats 50 in the vehicle compartment are set as candidates for the moving target. Therefore, in S240, based on the position of the obstacle in the vehicle compartment and the installation position of the four seats 50 in the vehicle compartment, the moving target is specified.

When equipment such as a mirror or a monitor is set as a candidate for the moving target, the moving target is specified among the seats 50 in the vehicle compartment and these equipment. In addition, even when the number of seats in the vehicle compartment is different, the moving target is specified among all the seats that is movable in the vehicle compartment.

Then, in S250, the moving target specified in S240 is moved in a direction that does not interfere with peripheral monitoring. When moving the moving target in S250, the current position of the moving target, that is, the position before the movement is acquired from the body ECU 40 and stored in the storage unit 36. Further, when the moving target is moved in S250, it shifts to S220 again, an obstacle is detected in the vehicle compartment, and it shifts to S230.

Next, when it is determined in S230 that no obstacle is detected, the process shifts to S260 and the operation mode of the millimeter wave sensor 22 is set to the above-mentioned monitoring mode. As a result, the millimeter wave sensor 22 starts peripheral monitoring shown in FIG. 3.

Therefore, when the control unit 30 sets the operation mode of the millimeter wave sensor 22 to the monitoring mode in S260, the control unit 30 shifts to a sleep state in S270 so that the control unit 30 interrupts the execution of the control process to reduce the power consumption in the control unit 30.

Then, when the control unit 30 is in the sleep state, and the detection signal of the suspicious object is input from the millimeter wave sensor 22 in S300, the control unit 30 returns from the sleep state to the normal state (that is, the control unit 30 wakes up) in S310. Then, in the subsequent S320, the camera 24 is activated to take an image of a suspicious object detected by the millimeter wave sensor 22.

Next, in S330, the image of the suspicious person is recognized by image processing the image captured by the camera 24, and in S340, it is determined whether or not the suspicious person is detected as a result of the image recognition of S330. Then, when it is determined in S340 that no suspicious person has been detected, the process proceeds to S270. As a result, the control unit 30 shifts to the sleep state again.

When it is determined in S340 that a suspicious person has been detected, the process proceeds to S350, and information indicating that the suspicious person is approaching the vehicle 9 is transmitted to the cloud 5 via the communication device 28. Then, the user's mobile terminal 20 is notified that a suspicious person is approaching the vehicle 9.

In S350, as information indicating that the suspicious person is approaching the vehicle 9, the image captured by the suspicious person by the camera 24 may be transmitted to the cloud 5 via the communication device 28. Further, in S350, since the suspicious person is approaching the vehicle 9, not only the user's mobile terminal 20 is notified, but also the alarm device 26 is operated to issue an alarm to notify the approaching suspicious person that the detection is performed on the vehicle 9 side.

Next, in S360, the recording of the captured image of the suspicious person by the camera 24 is started, and in the subsequent S370, it waits for the ending of the recording period by determining whether or not the recording period of the captured image of the suspicious person has ended. The recording of the captured image of the suspicious person is performed by storing the captured image in the storage unit 36, Further, in S370, for example, when the recording time reaches a predetermined time, or when the recording end command is received from the user's mobile terminal 20, it is determined that the recording period has ended.

When it is determined in S370 that the recording period has ended, the process proceeds to S380, the recording of the captured image of the suspicious person is ended, the image pickup by the camera 24 is stopped, and the process proceeds to S270. As a result, the control unit 30 shifts to the sleep state again.

Next, when the control unit 30 is in the sleep state, and the door lock device 44 connected to the body ECU 40 is switched to the unlocked state in S400, the control unit 30 returns from the sleep state to the normal state in S410 (that is, the control unit 30 wakes up).

Then, when the door lock is released and the control unit 30 wakes up, the control unit 30 determines in S420 that the vehicle 9 has returned from the parked state, and changes the operation mode of the millimeter wave sensor 22 from the monitoring mode to the normal mode.

Further, when the door lock is released, the occupant can open the door and get on the vehicle 9, so that the control unit 30 shifts to S430 and returns the moving target that has been moved in S250 to the original position, and the control process shown in FIG. 6 is terminated. When returning the moving target to the original position in S430, the position of the moving target before moving stored in the storage unit 36 at the time of executing the process of S250 is read, and the moving target is moved so as to be positioned at the read position. Further, after the control process is completed, the process shifts to S210 again and waits for the vehicle 9 to be parked.

In the present embodiment, the processing of S210 to S230 is an example of the operation of the obstacle detection unit 62, and the processing of S240-S250 and S370-S390 is an example of the operation of the obstacle movement unit 64. Further, the processing of S260-S360 is an example of the operation of the notification unit 66.

5. Effects of Embodiment

As described above, in the in-vehicle device 3 of the present embodiment, when the vehicle 9 is parked, the control unit 30 detects an obstacle that hinders peripheral monitoring in the vehicle compartment via the millimeter wave sensor 22.

Then, when the control unit 30 detects an obstacle, it determines which of the four seats 50 provided in the vehicle compartment is the obstacle, and the seat 50 identified by the determination is moved so as not to hinder the peripheral monitoring.

Therefore, when the millimeter wave sensor 22 is used to monitor the surroundings while the vehicle 9 is parked, it is possible to prevent from creating a blind spot by the seat 50 in the vehicle compartment and reducing the detection accuracy of a suspicious object approaching the vehicle 9.

Further, in the present embodiment, the millimeter wave sensor 22 is provided with a function of detecting a suspicious object approaching the vehicle 9 while the vehicle 9 is parked. Then, under a condition that the vehicle 9 is parked, the control unit 30 is shifted to the sleep state when no obstacle that blocks the periphery monitoring exists, or when the obstacle is moved to a position where the obstacle does not block the periphery monitoring even if the obstacle exists.

Therefore, in the in-vehicle device 3, it is possible to reduce the electric power consumption generated by the operation of the control unit 30 while the vehicle 9 is parked, and to suppress the decrease in the amount of electric power stored in the in-vehicle battery.

Further, when the millimeter wave sensor 22 detects a suspicious object approaching the vehicle 9 while the vehicle 9 is parked, the control unit 30 causes the camera 24 to image the suspicious object, and determines whether the suspicious object is a suspicious person, based on the captured image.

Then, in the case of a suspicious person, the user's mobile terminal 20 is notified via the cloud 5, and the image of the suspicious person captured by the camera 24 is stored in the storage unit 36. Therefore, the user can take security measures against the suspicious person, and when the vehicle 9 is illegally operated, the suspicious person can be identified from the captured image.

Further, after the vehicle 9 is parked and the control unit 30 moves an obstacle that hinders peripheral monitoring, when the door lock is released and the vehicle 9 returns from the parked state, the control unit 30 returns the obstacle that has been moved when parking to the original position before moving. Therefore, when the occupant opens the door and gets into the vehicle 9, it is possible to prevent the difficulty that the seat 50, which has been an obstacle to the peripheral monitoring, is displaced from the original position and it becomes difficult for the occupant to get on the vehicle.

In the present embodiment, the vehicle security system of the present disclosure is configured by the in-vehicle device 3 having a function as a security device as described above, the communication device 28, the millimeter wave sensor 22, and the camera 24. Further, by executing the control process shown in FIG. 5 by the control unit 30, the vehicle security method of the present disclosure is realized.

Other Embodiments

Although the embodiments of the present disclosure have been described above, the present disclosure is not limited to the above-described embodiments, and various modifications can be made.

For example, in the above embodiment, when a suspicious object is detected by the millimeter wave sensor 22, the control unit 30 detects the suspicious person by performing image recognition of the captured image by the camera 24, and notifies the cloud 5 of the suspicious person, and starts the recording of the captured image.

Alternatively, the control unit 30 may determine that the vehicle 9 has been tampered with when an anomaly such as vibration occurs in the vehicle 9 after the detection signal of the suspicious object is input from the millimeter wave sensor 22, and notify the cloud 5, and start recording of the captured image by the camera 24.

Further, in the above embodiment, the recording of the captured image by the camera 24 may not be performed after the suspicious person is detected, but may be performed during the image recognition in S330 after activating the camera 24 in S320, for example.

Further, in the above embodiment, the sensor used for monitoring the periphery of the vehicle 9 is described as a millimeter wave sensor 22. Alternatively, the sensor may be configured to detect an object by transmitting and receiving radio waves having a frequency different from that of millimeter waves, such as microwaves. Further, the sensor may be configured to detect an object by transmitting and receiving an electromagnetic wave different from the radio wave such as a laser beam.

Further, in the above embodiment, in the in-vehicle device 3, the control unit 30 has been described as an unit for acquiring information indicating a vehicle state such as a door lock from the body ECU 40 and executing the control process shown in FIG. 5. Alternatively, the control unit 30 may be configured to perform the security control process based on the instruction from the cloud 5.

In this case, on the cloud 5 side, for example, from the position of the vehicle 9, it is possible to detect that the vehicle 9 is parked in a place where security measures are required and it is possible to control the control unit 30 to execute the control process for security.

Further, the control unit 30 may be realized by a dedicated computer provided by configuring a processor with one or more dedicated hardware logic circuits. Further, the control unit 30 may be realized by one or more dedicated computers configured by a combination of a processor and a memory programmed to execute one or more functions and a processor configured by one or more hardware logic circuits. The technique for realizing the functions of the control unit 30 does not necessarily need to include software, and all the functions may be realized using one or a plurality of hardware circuits.

In addition, multiple functions of one component in the above embodiment may be realized by multiple components, or a function of one component may be realized by multiple components. Further, multiple functions of multiple components may be implemented by one component, or one function implemented by multiple components may be implemented by one component. A part of the configuration of the above embodiment may be omitted.

Further, the vehicle security device of the present disclosure may be configured as a dedicated security device as an independent device instead of the in-vehicle device 3 constituting the mobility IoT system 1 described above, and may be configured by a security system including a millimeter wave sensor 22, a communication device 28, and a camera 24.

Further, the present disclosure can be realized in various forms such as a program for making a computer function as a security device for a vehicle, a non-transitory tangible storage medium such as a semiconductor memory in which the program is recorded, and the like.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A security device for a vehicle in which a sensor for radiating an electromagnetic wave and detecting a target by receiving a reflection wave of the electromagnetic wave is arranged in a vehicle compartment, the security device comprising:
   a notification unit that notifies a user's mobile terminal via a cloud system when the vehicle is parked, and a suspicious object around the vehicle is detected by monitoring a periphery of the vehicle using the sensor;
   an obstacle detection unit that detects an obstacle interfering with a periphery monitoring and disposed in the vehicle compartment using the sensor prior to the periphery monitoring when the vehicle is parked; and
   an obstacle movement unit that moves a detected obstacle so as not to interfere with the periphery monitoring when the obstacle detection unit detects the obstacle.

2. The security device for the vehicle according to claim 1, wherein:
   the notification unit captures an image of the suspicious object by a camera mounted on the vehicle and stores a captured image in a storage unit when the suspicious object is detected by the periphery monitoring.

3. The security device for the vehicle according to claim 1, wherein:
   the obstacle detection unit determines that the vehicle is parked when a door of the vehicle is locked, and detects the obstacle.

4. The security device for the vehicle according to claim 1, wherein:
   the obstacle movement unit returns a moved obstacle to an original position before moving the obstacle when the vehicle returns from a parking state after moving the obstacle.

5. The security device for the vehicle according to claim 4, wherein:
   the obstacle movement unit returns the moved obstacle to the original position when determining that the vehicle returns from the parking state under a condition that a door lock of the vehicle is released.

6. The security device for the vehicle according to claim 1, wherein:
   a plurality of movable equipments that are displaceable by an actuator are disposed in the vehicle compartment; and
   when the obstacle detection unit detects the obstacle, the obstacle movement unit specifies a moving target to be moved as the obstacle among the plurality of movable equipments, based on a position of the obstacle in the vehicle compartment and an installation position of each of the plurality of movable equipments in the vehicle compartment; and
   the obstacle movement unit moves the moving target using the actuator.

7. The security device for the vehicle according to claim 6, wherein:
   at least one of the plurality of movable equipments is a seat of which a position is adjustable using the actuator; and
   the position of the seat includes an inclination of a backrest.

8. The security device for the vehicle according to claim 1, further comprising:
   one or more processors; and
   a memory coupled to the one or more processors and storing program instructions that when executed by the one or more processors cause the one or more processors to provide at least: the notification unit; the obstacle detection unit; and the obstacle movement unit.

9. A security system for a vehicle comprising:
a communication device that is communicable between an user's mobile terminal and a communicable cloud system;
a sensor that is disposed in a vehicle compartment of the vehicle, radiates an electromagnetic wave, and detects a target by receiving a reflection wave of the electromagnetic wave; and
a security device having a notification unit that notifies the user's mobile terminal by communicating with the cloud system via the communication device when the vehicle is parked, and a suspicious object around the vehicle is detected by monitoring a periphery of the vehicle using the sensor, wherein:
the security device further includes:
an obstacle detection unit that detects an obstacle interfering with a periphery monitoring and disposed in the vehicle compartment using the sensor prior to the periphery monitoring when the vehicle is parked; and
an obstacle movement unit that moves a detected obstacle so as not to interfere with the periphery monitoring when the obstacle detection unit detects the obstacle.

10. The security system for the vehicle according to claim 9, wherein:
the security device shifts to a sleep mode in which the notification unit, the obstacle detection unit, and the obstacle movement unit stop operation when the vehicle is parked and the obstacle detection unit does not detect the obstacle, or when the vehicle is parked, and the obstacle movement unit moves the obstacle; and
the security device shifts from the sleep mode to a normal mode in which the notification unit, the obstacle detection unit, and the obstacle movement unit execute the operation when the security device is in the sleep mode, and the sensor detects the target.

11. The security system for the vehicle according to claim 10, wherein:
the sensor is configured to monitor a periphery of the vehicle when an operation mode of the sensor is a monitoring mode, and output a detection signal to the security device when a suspicious object is detected by a periphery monitoring;
when the security device shifts to the sleep mode, the security device sets the operation mode of the sensor to be the monitoring mode; and
when the security device is in the sleep mode, and the sensor outputs the detection signal to the security device, the security device returns from the sleep mode to the normal mode.

12. The security system for the vehicle according to claim 9, further comprising:
a camera that captures an image of the periphery of the vehicle, wherein:
the security device is configured to activate the camera based on a target detection by the sensor and to capture the image of the suspicious object.

13. The security system for the vehicle according to claim 9, wherein:
the sensor is a millimeter wave sensor configured to radiate a millimeter wave and receive a reflection wave of the millimeter wave to detect the target.

14. The security system for the vehicle according to claim 9, further comprising:
one or more processors; and
a memory coupled to the one or more processors and storing program instructions that when executed by the one or more processors cause the one or more processors to provide at least: the security device.

15. A security method for a vehicle in which a sensor for radiating an electromagnetic wave and detecting a target by receiving a reflection wave of the electromagnetic wave is arranged in a vehicle compartment, the security method comprising:
notifying a user's mobile terminal via a cloud system when the vehicle is parked, and a suspicious object around the vehicle is detected by monitoring a periphery of the vehicle using the sensor;
detecting an obstacle interfering with a periphery monitoring and disposed in the vehicle compartment using the sensor prior to the periphery monitoring when the vehicle is parked; and
moving a detected obstacle so as not to interfere with the periphery monitoring when detecting the obstacle.

16. A non-transitory computer readable storage medium comprising instructions for execution by a computer, the instructions causing one or more processors to provide at least: the notification unit; the obstacle detection unit; and the obstacle movement unit according to claim 1.

* * * * *